(12) United States Patent
Gandy

(10) Patent No.: US 6,938,740 B2
(45) Date of Patent: Sep. 6, 2005

(54) SUITCASE WITH STAIR ROLLER AND BRAKE

(76) Inventor: Cheryl M. Gandy, 9060 Palisade, #624, North Bergen, NJ (US) 07047

( * ) Notice: Subject to any disclaimer, the term of this patent is extended or adjusted under 35 U.S.C. 154(b) by 0 days.

(21) Appl. No.: 10/294,927

(22) Filed: Nov. 14, 2002

(65) Prior Publication Data

US 2004/0094378 A1 May 20, 2004

Related U.S. Application Data

(60) Provisional application No. 60/339,670, filed on Dec. 11, 2001.

(51) Int. Cl.[7] .............................................. A45C 5/14
(52) U.S. Cl. .................. 190/18 A; 190/115; 280/37; 280/47.371; 280/655
(58) Field of Search .................. 280/5.22, 37, 47.371, 280/655, 5.2; 188/19, 14, 12, 14.12; 190/18 A, 115

(56) References Cited

U.S. PATENT DOCUMENTS

| | | | | |
|---|---|---|---|---|
| 970,787 A | * | 9/1910 | Brown ....................... 280/5.22 |
| 2,597,532 A | | 5/1952 | Richardson et al. |
| 2,988,175 A | * | 6/1961 | West ........................... 188/31 |
| 3,314,494 A | * | 4/1967 | Weitzner .................... 180/208 |
| 3,370,664 A | | 2/1968 | Caplan |
| 3,376,954 A | * | 4/1968 | Neptune ...................... 188/69 |
| 3,690,415 A | * | 9/1972 | Nordskog .................... 188/69 |
| 3,810,649 A | * | 5/1974 | Fahey, Jr. .................... 280/37 |
| 4,130,291 A | | 12/1978 | Saethre et al. |
| 4,281,849 A | | 8/1981 | Chandick et al. |
| 4,688,813 A | | 8/1987 | Misawa et al. |
| 5,097,922 A | * | 3/1992 | Stagi .......................... 180/208 |
| 5,340,131 A | * | 8/1994 | Smathers et al. ...... 280/11.212 |
| 5,343,988 A | * | 9/1994 | Bartsch et al. ............. 190/18 A |
| 5,456,342 A | * | 10/1995 | Rekuc et al. .............. 190/18 A |
| 5,497,865 A | * | 3/1996 | Yun-Pi ....................... 190/115 |
| 5,579,877 A | * | 12/1996 | Homayoon ................ 190/18 A |
| 5,868,403 A | * | 2/1999 | Culp et al. .................. 280/5.22 |
| 5,927,441 A | * | 7/1999 | Luo ............................. 188/19 |
| 6,041,900 A | * | 3/2000 | Sadow et al. ............. 190/18 A |
| 6,202,808 B1 | * | 3/2001 | Sadow ...................... 190/18 A |
| 6,213,561 B1 | * | 4/2001 | Witthaus .................... 301/6.1 |
| 6,460,866 B1 | * | 10/2002 | Altschul et al. .............. 280/30 |
| 6,688,614 B2 | * | 2/2004 | Hsu ............................. 280/37 |

FOREIGN PATENT DOCUMENTS

| FR | 2656581 A1 | * | 7/1991 | ............. B62B/5/02 |
|---|---|---|---|---|
| FR | 2659285 A1 | * | 9/1991 | ............. B62B/5/02 |
| GB | 1428163 | * | 3/1976 | ............. B62B/5/04 |

* cited by examiner

Primary Examiner—Sue A. Weaver
(74) Attorney, Agent, or Firm—McCormick, Paulding & Huber LLP

(57) ABSTRACT

A suitcase includes a housing defining an interior chamber. The housing has a panel, which has a first end and a second end. The panel also has at least one wheel rotatably connected to the housing adjacent to the first end of the panel for enabling rolling movement of the suitcase across a surface. A plurality of spaced apart axles are fixedly connected to the housing. The suitcase also contains a roller being rotatably carried by each of the axles. Each of the rollers have a portion protruding into the panel and a portion protruding exterior to the panel. An endless belt may be circumscribed around the rollers.

16 Claims, 5 Drawing Sheets

SUITCASE WITH STAIR ROLLER AND BRAKE

CROSS REFERENCE TO RELATED APPLICATIONS

Figures 1, 2:
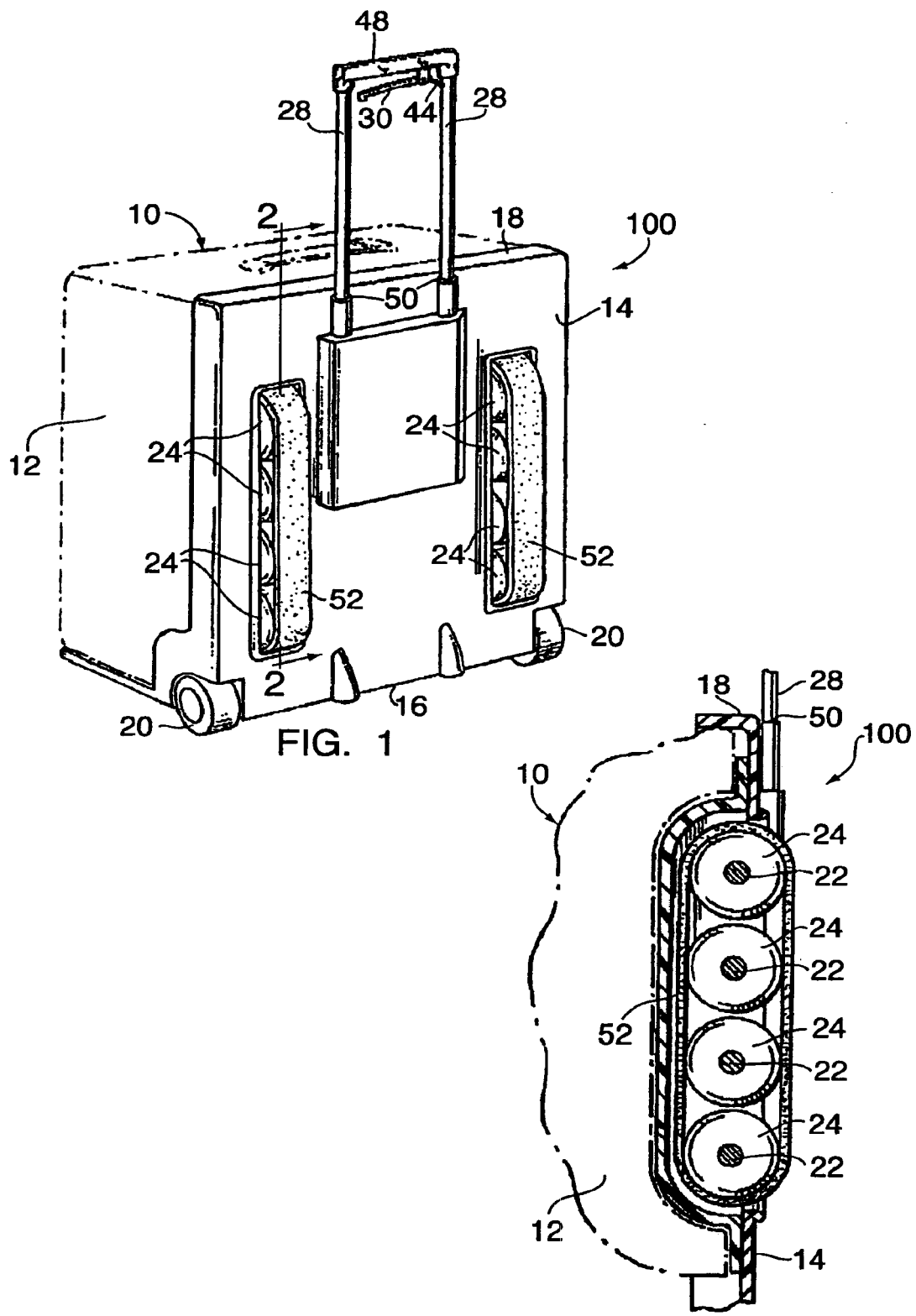

This application claims the benefits of prior filed, provisional patent application Ser. No. 60/339,670 filed Dec. 11, 2001.

BACKGROUND OF THE INVENTION

The present invention relates to suitcases with wheels to assist in transporting the suitcase. More specifically, the present invention relates to a suitcase that has rollers mounted on the back of the suitcase to assist in pulling it up a flight of stairs. The suitcase also has a braking mechanism to hold the rollers and, thus, the case in place if stopped on the stairs.

Suitcases are available in a wide variety of shapes and sizes. Traditionally, suitcases have been provided with a single carrying handle to allow the user to lift the suitcase and carry it from place to place. Recently, suitcases have been designed with rollers on the bottom of the suitcase. Rollers permit the suitcase to be rolled across a ground surface such as the floor of an airport terminal or a passenger aisle of an aircraft. These suitcases also have a handle secured to the case that can be telescopically extended to permit the user to steer the rolling suitcase in the direction desired. While these types of rolling suitcases are extremely well suited to be rolled across a flat floor, they are very difficult to maneuver over a set of steps. It is not uncommon for a traveler to encounter a situation where there is no elevator or escalator available and a set of stairs needs to be traversed. Typically, in that situation, the owner of the suitcase has to lift the suitcase up and over each step as the back of the suitcase rubs against the steps making it difficult to engage the wheels. This also leads to a jerking motion as the suitcase hops from stair to stair. The typical rolling suitcase is not well suited or moving luggage up and down a flight of stairs. The prior art has shown the inclusion of skids on the back of the suitcase panel to ease the suitcase sliding up the stairs. However, these skids are typically not as frictionless as they need to be, wear down with use and the user has to bear a lot of the weight in dragging the suitcase up a flight of stairs.

U.S. Pat. No. 5,575,361 to Chou discloses a wheeled suitcase. Chou's suitcase places the rollers on the bottom of the suitcase so the suitcase can be easily wheeled over a flat surface. However, the placement of these wheels will not aid an owner in carrying their suitcase up a flight of stairs. The wheels are located as such so they cannot engage two consecutive steps at the same time and thus offer no assistance in dragging the suitcase up a flight of stairs.

U.S. Pat. No. 6,041,900 to Sadow et al. discloses a towable article of luggage. Sadow's improvement places wheels not only on the bottom of the luggage but on the main front face of the luggage. Such wheel placement stabilizes the luggage by placing the widest surface to the luggage closest to the ground and it allows more luggage to be stacked on top of each other. However, again, the placement of the wheels offer no assistance when dragging the luggage up a flight of stairs. The wheels are small caster types wheels and do not offer a continuous surface to traverse multiple stairs at once.

U.S. Pat. No. 5,147,019 to Van Hooreweder et al. discloses a brake system for a luggage case. This invention has a ground engaging arm that pivotally moves beneath the luggage to stop its forward movement. The arm pivots out from under the luggage and actually lifts the luggage wheels off the ground to stop the luggage from moving. However, this method of stopping a piece of luggage would be completely ineffective in stopping a suitcase perched between two steps, because there would be no surface for the arm to engage with and lifting the suitcase off the steps would increase the strain on the user.

SUMMARY OF THE INVENTION

It is the foregoing and various other drawbacks of the prior art which the present invention seeks to overcome by providing a suitcase which can be easily pulled up a flight of stairs. This is uniquely and ideally achieved by providing for one or two sets of rollers connected to the back panel of the suitcase. These rollers can be bare or have an endless belt around them to assist in rolling the suitcase up a flight of stairs. These rollers allow the suitcase to easily glide up a set of stairs when the user pulls it up.

In accordance with the currently preferred exemplary embodiment of the present invention, these and other objectives are achieved with a suitcase comprised of a housing defining an interior chamber. The housing has a panel which has a first end and a second end. Also, the panel has a predetermined width between the first and second ends. The panel also has at least one wheel, and typically two, rotatably connected to the housing adjacent to the first end of the panel to enable a rolling movement of the suitcase across a surface. There is also a plurality of spaced apart axles connected to the housing. The suitcase also contains a roller being rotatably carried by each of the axles, each of the rollers have a portion protruding into the panel and a portion protruding exterior to the panel.

Also, in accordance with a further feature of the present invention, to aid in carrying the suitcase up a flight of stairs, the rollers are also preferably designed with a braking mechanism. The braking mechanism allows the user to stop the suitcase in mid climb of a flight of stairs without the suitcase slipping back or undo strain on the user themselves in holding the suitcase in place.

DRAWINGS

Figure 3:
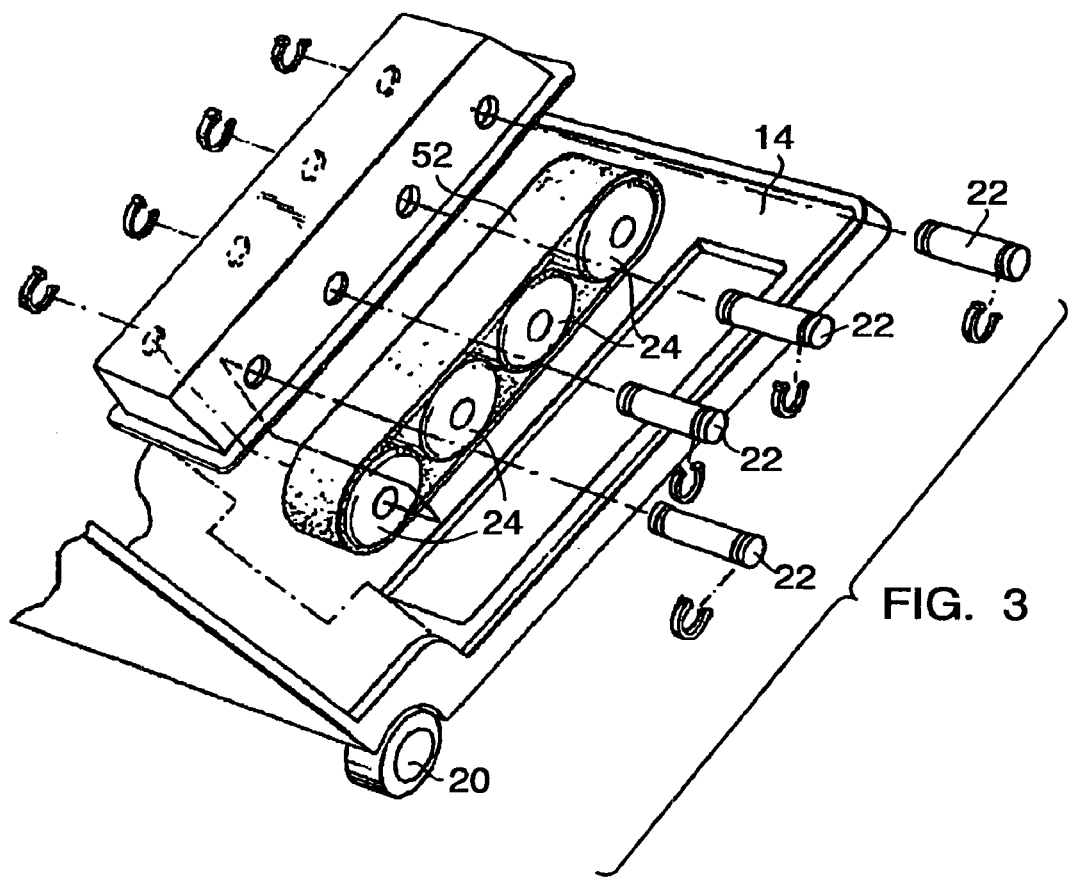
Figure 4:
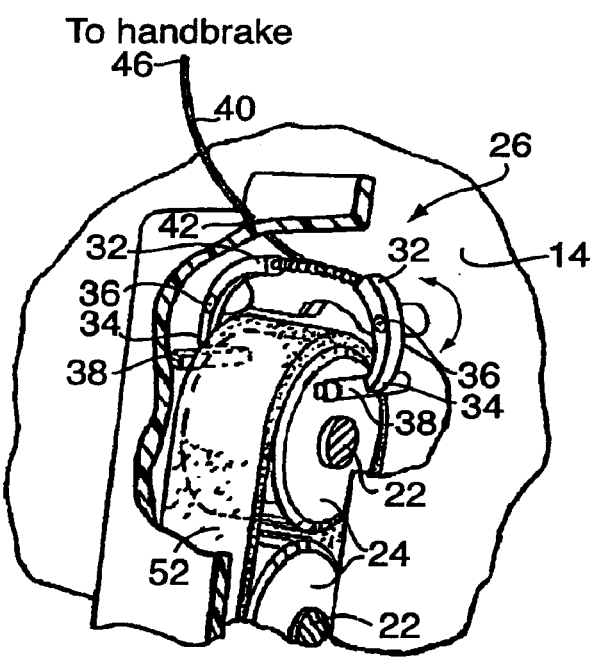
Figure 5:
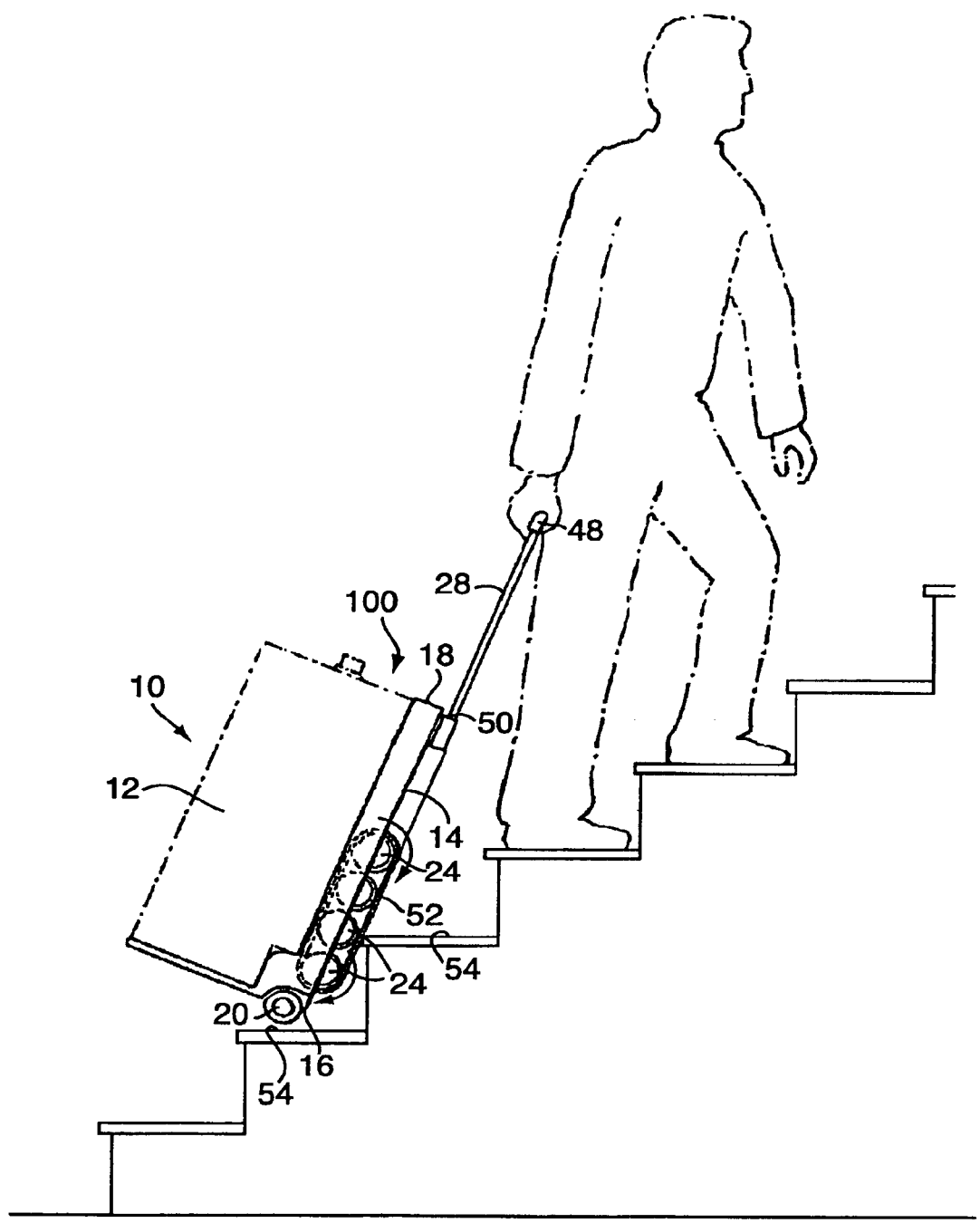
Figure 6:
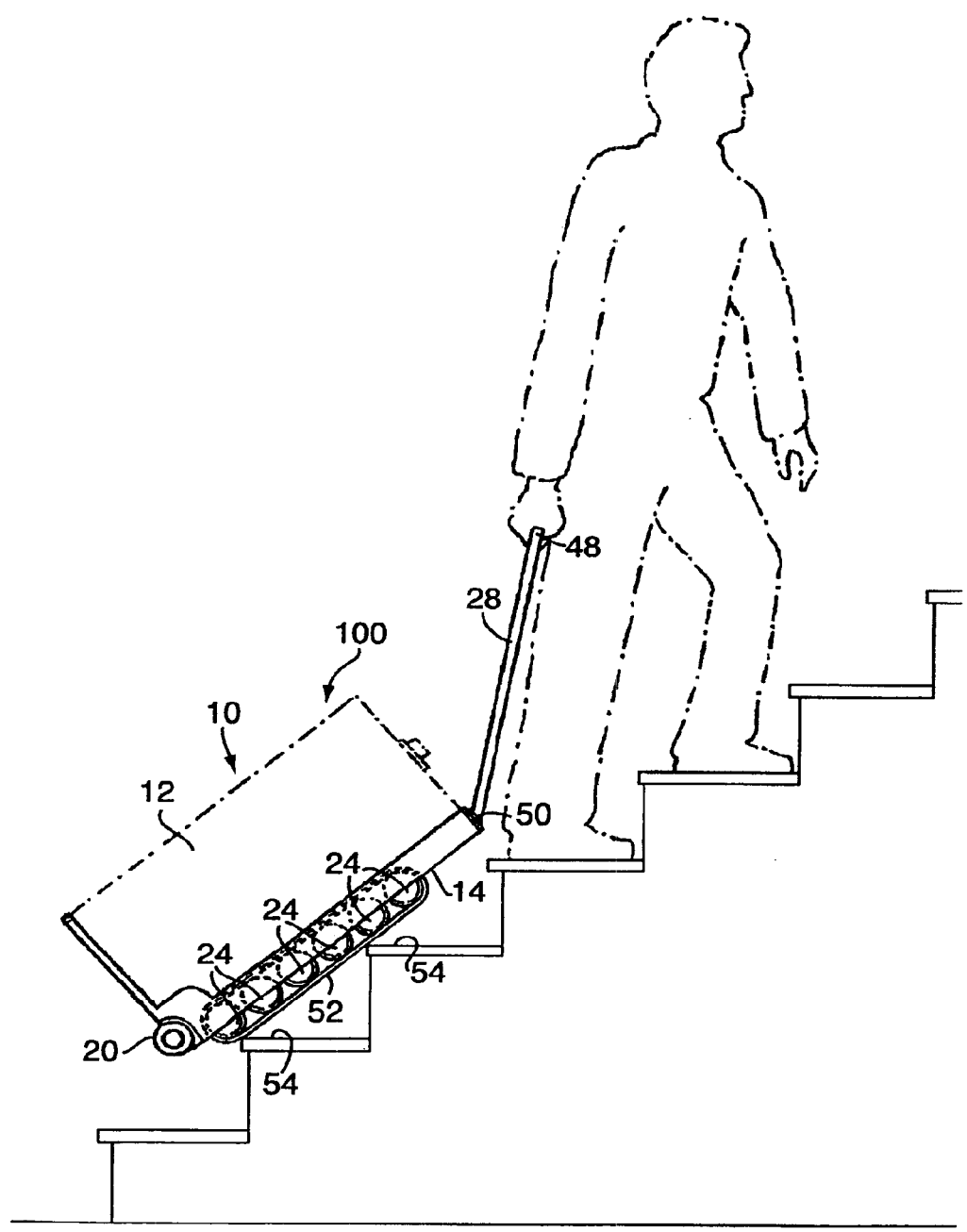
Figure 7:
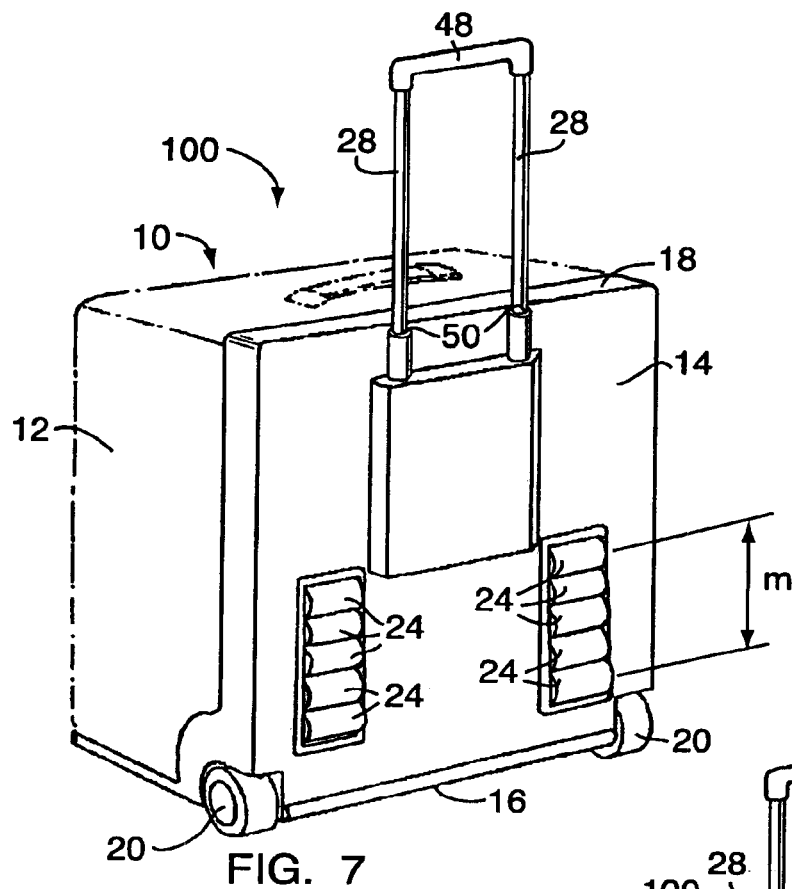
Figure 8:
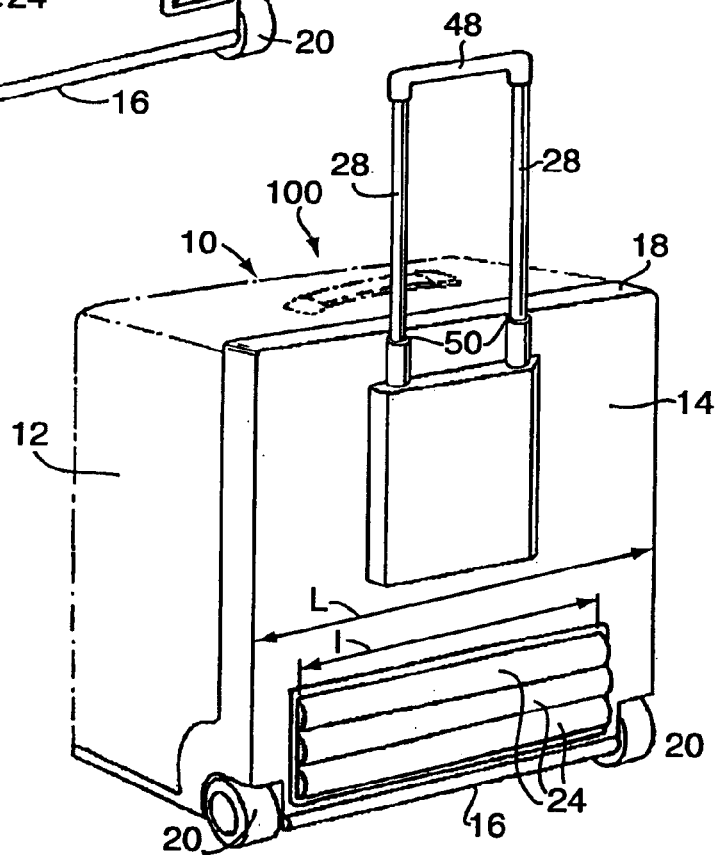

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 1 is a perspective view of the suitcase in accordance with the preferred embodiment, FIG. 2 is a cross-sectional view taken along line 2—2 of FIG. 1 and looking in the direction of the arrows, FIG. 3 is an exploded perspective view of the rollers and axles in accordance with the preferred embodiment, FIG. 4 is a partial perspective view showing the hand brake with part of the housing broken away, FIG. 5 is a side view of the preferred embodiment of the invention in use, FIG. 6 is a side view of the preferred embodiment of the invention in use with the pull handle pivoted, FIG. 7 is a prospective view of a second preferred embodiment, and FIG. 8 is a prospective view of a third preferred embodiment.

DETAILED DESCRIPTION OF THE PREFERRED EMBODIMENT

Referring now to FIGS. 1–6, a suitcase 100 in accordance with the present invention is illustrated. Suitcase 100 includes a housing 10 that defines an interior chamber 12. Housing 10 has a rear panel 14. Panel 14 has a first end 16 and a second end 18. Panel 14 has a predetermined width between the first and second ends. Two wheels 20 are rotatably connected to housing 10 adjacent to the first end 16 of panel 14. Wheels 20 permit suitcase 100 to easily roll across a smooth surface. A plurality of spaced apart axles 22 are fixedly connected to the housing 10. A roller 24 is rotatably carried by each of the axles 22. Each roller 24 has a portion protruding into the panel 14 and a portion protruding exterior to the panel 14, as shown in FIGS. 2, 5 and 6.

Suitcase 100 further includes a braking mechanism 26 connected to housing 10 as shown in FIG. 4. The suitcase also includes a rigid telescoping pull handle 28 connected to the housing 10, with the pull handle 28 being at least partially hollow. A brake lever 30 is connected to the pull handle 28, and the brake lover 30 is movable with respect to the pull handle 28 between a first position and a second position. Braking mechanism 26 has two brake arms 32. Each of the brake arms 32 has a pad end 34 and a pivot end 36. The brake arms 32 ate pivotally attached to each other at the pivot end 36 of the brake arms 32. Each of the brake arms 32 has at least one brake pad 38 attached to the brake arms 32 at the pad end 34. Each of the brake pads 38 are frictionally engagable with the same roller 24 from opposite sides as shown in FIG. 4. A brake wire 40 slidable within a conventional flexible sheath (not shown) has a first end 42, a second end 44, and an intermediate portion 46. Brake wire 40 is attached at the first end 42 to the brake anus 32 at the pivot end 36. The intermediate portion 46 of the brake wire 40 includes a portion that is disposed within the hollow portion of the pull handle 28. Lastly, the second end 44 of the brake wire 40 is attached to the brake lever 30. In the first position (i.e., when the brake lever is clasped), the brake lever 30 applies tension to the brake wire 40 causing the brake arms 32 to pivot about the pivot end 36, thereby causing at least one of the brake pads 38 to frictionally engage with the roller 24. In the second position (i.e., when the brake lever is released), the brake lever releases the tension on brake wire 40, causing the brake arms to pivot away from roller 24. Brake mechanism 26 works similar to how a conventional bicycle hand brake works, and, therefore, further details regarding the operation of brake mechanism 26 will not be discussed for the sake of brevity as one skilled in die art will readily recognize from the present disclosure how to make and use the braking mechanism.

A gripping member 48 is attached to pull handle 28. Pull handle 28 is also slidably mounted adjacent to the second end 18 of the panel 14 and telescopes generally outward from the second end 18 of panel 14 and generally parallel to panel 14. Pull handle 28 moves between a storage position and an extended position. The pull handle 28, in the extended position, can be moved about a pivot 50 to a desired angle of inclination.

The axles 22 associated with each of the rollers 24 are parallel to each other and are fixedly connected to panel 14. In the embodiment shown in FIGS. 1–6, an endless belt 52 is circumscribed around the rollers 24 and the endless belt 52 has a width approximately equal to the width of the rollers 24. As shown in FIG. 1, a second set of a plurality of spaced apart axles 22 are connected to housing 10. A second set of rollers 24 are rotatably carried by each of the axles 22 of the second set. Just like the first set, each of the rollers 24 of the second set of rollers 24 have a portion protruding into the panel 14 and a portion protruding exterior to the panel 14. There is also a second endless belt 52 circumscribed around the second set of rollers 24, with the second endless belt 52 having a width approximately equal to the width of the second set of rollers 24. The second set of axles 22 and rollers 24 are spaced apart from the first set, as shown in FIG. 1. Each of the sets of axles 22 and rollers 24 contain a sufficient number of axles 22 and rollers 24 so that each of the endless belts 52 are long enough to make contact with the edge of two consecutive steps 54 of a set of conventionally sized stairs, as shown in FIG. 6.

Referring now to FIG. 7, another embodiment of the present invention is illustrated. This embodiment has a first set and a second set of a plurality of spaced apart axles 22, each connected to housing 10. A roller 24 is rotatably carried by one of the axles 22. Each of the rollers 24 in each set has a portion protruding into panel 14 and a portion protruding exterior to panel 14. The first set of rollers 24 and axles 22 are spaced from the second set of the rollers 24 and the axles 22. The rollers 24 in each set are aligned linearly in a direction extending from the first end 16 of panel 14 to the second end 18 of panel 14.

The two sets of rollers 24 each contain a sufficient number of rollers 24 so that one of the rollers 24 of the first set and one of the rollers 24 of the second set can make contact with the edge of one step 54 of a set of conventionally sized stairs, while another of the rollers 24 of die first set and another of the rollers 24 of the second set can make concurrent contact with the next consecutive step 54 in either direction. The rollers 24 extend a minimum distance m along the panel width of thirteen (13) inches because conventionally the edge of a set of stairs are about thirteen inches apart.

Referring now to FIG. 8, a third embodiment of die present invention is Illustrated. With this embodiment only one set of rollers 24 are rotatably mounted on back panel 14. Rollers 24 preferably have a length L that is at least half of the length L of panel 14. More preferably, the rollers 24 have a length that is at least 80% of the length L of panel 14. In addition, if desired, an endless belt may be circumscribed around rollers 24.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

Reference citations, patents and patent applications, and product descriptions and protocols are cited throughout this application, the disclosures of which are incorporated herein by reference in the entireties for all purposes.

What is claimed is:

1. A suitcase comprising:

a housing defining an interior chamber, said housing having a panel, said panel having a first end and a second end, said panel having a predetermined width between said first and second ends, and having a length perpendicular to us width, at least one wheel rotatably connected to said housing adjacent to said first end of said panel for enabling rolling movement of said suitcase across a surface, a rigid telescoping pull handle connected to said housing, said pull handle being hollow, a brake lever connected to said pull handle, said brake lever being movable with respect to said pull handle between a first position and a second position, a plurality of spaced apart axles connected to said housing, a roller being rotatably carried by each of said axles, each of said rollers have a portion protruding into said panel and a portion protruding exterior to said panel, an endless belt circumscribed around said rollers, and a braking mechanism connected to said housing, said braking mechanism being selectively operative to engage one of said rollers so as to prevent rotation of said endless belt, said braking mechanism having two brake arms, each of said brake arms having a pad end and a pivot end, said brake arms being pivotally attached to each other at said pivot end of said brake arms, said brake arms being attached to said housing at said pivot end.

2. A suitcase as defined in claim 1, wherein each of said brake arms having at: least one brake pad attached to said brake arms at said pad end, each of said brake pads being frictionally engagable with at least one of said rollers.

3. A suitcase as defined in claim 2, wherein each of said brake pads are frictionally engagable with the same one of said rollers.

4. A suitcase as defined in claim 3, further comprising a brake wire having a first end, a second end, and an intermediate portion therebetween, said brake wire being attached at said first end to said brake arms at said pivot end, said intermediate portion of said brake wire being disposed within said pull handle, and said second end of said brake wire being attached to said brake lever, in said first position, said brake lever applies tension to said brake wire causing said brake arms to pivot about said pivot end, thereby causing at least one of said brake pads to frictionally engage with said roller.

5. A suitcase defined in claim 1, further comprising a gripping member being attached to said pull handle, said pull handle being slidably mounted on said housing and telescoping generally outwardly from said housing and generally parallel to said panel, said pull handle moving between a storage position and an extended position.

6. A suitcase as defined in claim 5, wherein said pull handle in said extended position being moveable about a pivot to a desired angle of inclination.

7. A suitcase as defined in claim 1, wherein said axles are parallel to each other.

8. A suitcase as defined in claim 1, wherein said axles being connected to said panel.

9. A suitcase as defined in claim 1, said endless belt having a axial length approximately equal to the axial length of said rollers.

10. A suitcase as defined in claim 9, further comprising a second set of a plurality of spaced apart axles connected to said housing, a second set of rollers, each roller of said second set being rotatably carried by each of said axles of said second set, each of said rollers of said second set of rollers have a portion protruding into said panel and a portion protruding exterior to said paned, a second endless belt being circumscribed around said second set of rollers, said second endless belt having a width approximately equal to the axial length of said second set of rollers, said second set of axles and roller, are spaced from the first set, each of said sets of axles and rollers contain a sufficient number of axles and rollers so that each of said endless belts are long enough to make contact with flue edge of two consecutive steps of a set of conventionally sized stairs.

11. A suitcase defined in claim 1, further comprising a second set of a plurality of spaced axles connected to said housing, a second set of rollers, each roller of said second set being rotatably carried by each of said axles of said second set, each of said second set of rollers have a portion protruding into said panel and a portion protruding exterior to said paned, said first set of said rollers and said axles being spaced from said second set of said rollers and said axles.

12. A suitcase as defined in claim 4, wherein said rollers in each set being aligned linearly in a direction extending from said first end of said panel to said second end of said panel.

13. A suitcase as defined in claim 4, wherein said two sets of said rollers each contain a sufficient number of rollers so that one of said rollers of said first set and one of said rollers of said second set can make contact with the edge of one step of a set of conventionally sized stairs, while another of said rollers of said first set and another of said rollers of said second set can make concurrent contact with the next consecutive step in either direction.

14. A suitcase as defined in claim 13, wherein said rollers extend along the width of the panel a minimum of thirteen (13) inches, said sets of said rollers being placed on opposite sides of said panel.

15. A suitcase as defined in claim 1, wherein there is solely one set of said rollers, said rollers have a length that is at least half of said length of said panel.

16. A suitcase as defined in claim 15, wherein said rollers have a length that is at least 80% of said length of said panel.

* * * * *

UNITED STATES PATENT AND TRADEMARK OFFICE
CERTIFICATE OF CORRECTION

PATENT NO. : 6,938,740 B2 Page 1 of 1
APPLICATION NO. : 10/294927
DATED : September 6, 2005
INVENTOR(S) : Cheryl M. Gandy It is certified that error appears in the above-identified patent and that said Letters Patent is hereby corrected as shown below:

Column 4, line 62, the word "us" should read as --its--.
Column 6, line 14, the word "roller" should read as --rollers--.
Column 6, line 17, the word "flue" should read as --the--.
Column 6, line 28, "4" should be --11-- and line 32, "4" should be --11--.

Signed and Sealed this

Twentieth Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 6,938,740 B2  Page 1 of 1
APPLICATION NO. : 10/294927
DATED : September 6, 2005
INVENTOR(S) : Cheryl M. Gandy It is certified that error appears in the above-identified patent and that said Letters Patent is hereby corrected as shown below:

Column 4, line 62, the word "us" should read as --its--.
Column 6, line 14, the word "roller" should read as --rollers--.
Column 6, line 17, the word "flue" should read as --the--.
Column 6, line 28, "4" should be --11-- and line 32, "4" should be --11--.

Signed and Sealed this

Twenty-fifth Day of December, 2007

JON W. DUDAS
*Director of the United States Patent and Trademark Office*